United States Patent [19]

Cramer et al.

[11] 3,734,078
[45] May 22, 1973

[54] MEANS FOR ANTICIPATING ANTI-G FORCE IN A MOVING VEHICLE

[75] Inventors: Robert L. Cramer; John W. Henneman; William P. Myers, all of Davenport, Iowa

[73] Assignee: The Bendix Corporation, South Bend, Ind.

[22] Filed: May 12, 1971

[21] Appl. No.: 142,650

[52] U.S. Cl. .................................128/1 A, 137/38
[51] Int. Cl. .............................................A61b 19/00
[58] Field of Search ..............128/1 A, 142.5, 2.1 A, 128/DIG. 3; 137/38, 39, 63 R

[56] References Cited

UNITED STATES PATENTS

| | | | |
|---|---|---|---|
| 2,753,881 | 7/1956 | Holmes | 137/38 |
| 2,952,264 | 9/1960 | Burns | 137/39 |
| 3,319,627 | 5/1967 | Windsor | 128/145.8 |
| 3,430,642 | 3/1969 | Mack | 137/39 |
| 3,474,812 | 10/1969 | Robertson | 128/145.8 |

Primary Examiner—Charles F. Rosenbaum
Attorney—Leo H. McCormick, Jr. and Plante, Hartz, Smith & Thompson

[57] ABSTRACT

An anti-G valve with a pressure sensitive wall member which compares ambient pressure with ram pressure to anticipate a condition from which high onset of "g" could occur and transmits an operational signal. The transmitted operational signal controls the flow of a first fluid under pressure to unbalance a valve permitting the first fluid to flow through a nozzle into a chamber. The static pressure adjacent the nozzle outlet being lower than ambient pressure causes ambient air to enter the chamber. The first fluid and ambient air together pressurize an anti-G garment to protect a recipient from any adverse effects caused by an increase in the acceleration force.

17 Claims, 2 Drawing Figures

INVENTOR.
ROBERT L. CRAMER
JOHN W. HENNEMAN
BY WILLIAM P. MYERS

Geo H McCormick Jr.

INVENTOR.
ROBERT L. CRAMER
JOHN W. HENNEMAN
BY WILLIAM P. MYERS
Leo H. McCormick Jr.

MEANS FOR ANTICIPATING ANTI-G FORCE IN A MOVING VEHICLE

BACKGROUND OF THE INVENTION

In velocity, through designed aircraft it has become important to protect the aviator when he is subjected to acceleration and centrifugal forces during various dives and maneuvers. These forces have the effect of apparently increasing the weight of the aviator. The term "G" has come into use to denote increase in body weight due to this type of acceleration. The term "G" has been given a numerical value equivalent to 32.2 ft./sec/sec. which is the acceleration of mass due to gravity. Thus, the apparent weight increase is directly proportional to function of gravitational acceleration. Because the presently designed aircraft can perform at low altitudes with high speeds, a rapid onset of "G's" will be possible. When the aviator is subjected to these forces, blood will drain from his brain to the extent that his optic nerves are affected which will result in a temporary blindness. This blindness is commonly referred to as "blacking-out." In this connection anti-G garments and anti-G valves have been devloped to work in combination to prevent the "blacking-out" of the pilot when he is subjected to excessive acceleration force.

The anti-G valves which are now being used are of two main types:

One type is an anti-G valve of the continuous flow design. This type is a direct mechanically operated valve having a spring and weight construction in which fluid is continuously fed through the valve and upon an acceleration force being applied, the flow of fluid through the valve is restricted resulting in a build-up of fluid pressure in the valve and the associated G-garment.

A second type of anti-G valve is one of the demand valve design. This type is a direct mechanically operated valve having a spring and weight construction in which the flow of fluid into the valve and associated anti-G garment is regulated according to acceleration forces being applied to the valve. Both of these valves employ a direct mechanical locating method of opening and closing the valve when the valve is subjected to an acceleration force. The structure necessary to make an operative valve of this construction is bulky and heavy.

However, in anti-G valves now being used, the acceleration force must be present before the operation of inflating and pressurizing the anti-G garment is initiated. The correct pressure must be applied to a recipient wearer's body at all times in order to give proper protection. The pressure applied to the recipient wearer's body must be sufficient to protect him against the decreased atmospheric pressure at various altitudes and the accelerational force attributed to the maneuvers of the aircraft. Therefore, the pressure on the recipient wearer's body at the area where the anti-G garment is worn must be the sum of the pressure required because of accelerational force and of the atomospheric conditions.

SUMMARY OF THE INVENTION

In the device we have invented, any change in dynamic condition which could result in a rapid onset of acceleration force which would adversely affect a recipient will be anticipated and fluid flow to an anti-G garment will be controlled to protect the recipient wearer. The dynamic conditions will be sensed by comparing a reference pressure and with a pressure resulting from the velocity of a vehicle moving through a fluid. The dynamic conditions of the vehicle will be sensed to indicate the capability of the recipient to maneuver the vehicle without being impaired. If the dynamic conditions, as sensed, indicate that an unacceptable inflation rate of the anti-G garment would be required, the anti-G garment will be partially filled prior to the actual forces being received by the recipient. This prefill of the anti-G garment will reduce the time and inflation rate to provide the recipient with protection should an unacceptable acceleration force be subsequently received. Thus, the recipient will be protected from adverse acceleration forces at all times.

In our device, we have incorporated means into the device whereby the anti-G garment of the wearer is inflated and pressurized by ambient air and a first fluid to reduce the possibility of having 100 percent of the first fluid (usually oxygen) in the anti-G garment. This mixture will conserve the first fluid and reduce the combustibility of the fluid mixture in the anti-G garment to an acceptable level.

Through valving means in this device, a variable rate of flow to the anti-G garment will be possible. Initially, inflation is rapid but as the wearer begins to feel some force exerted on his body, the rate is reduced. A check valve located in the device will limit the amount of fluid pressure which can be exerted by the inflated anti-G on the body.

It is therefore the object of this invention to provide an anti-G valve device with means to anticipate rapid "G" onset and provide a recipient with protection.

It is another object of this invention to provide anti-G garment with the means whereby initial inflation is rapid and decreases proportionally thereafter as the force exerted on the wearer increases.

It is another object of this device to provide the means whereby an anti-G garment is inflated without discomforting the wearer during rapid onset of "g" conditions.

It is still another object of this device to provide the means whereby the anti-G garment is inflated with a mixture of fluids under pressure to reduce the possibility of a fire occurring in the anti-G garment.

These and other objects of this invention will become apparent to those who read the specification and view this drawing.

FIG. 1 is a schematic of an anti-G protection system for protecting the wearer of an anti-G garment in accordance with the principles of this invention; and FIG. 2 is a sectional view of an anti-G valve with anticipatory means within the protection system of FIG. 1 for sensing rapid acceleration of a moving vehicle.

DETAILED DESCRIPTION OF THE PREFERRED EMBODIMENT

Figure 1:
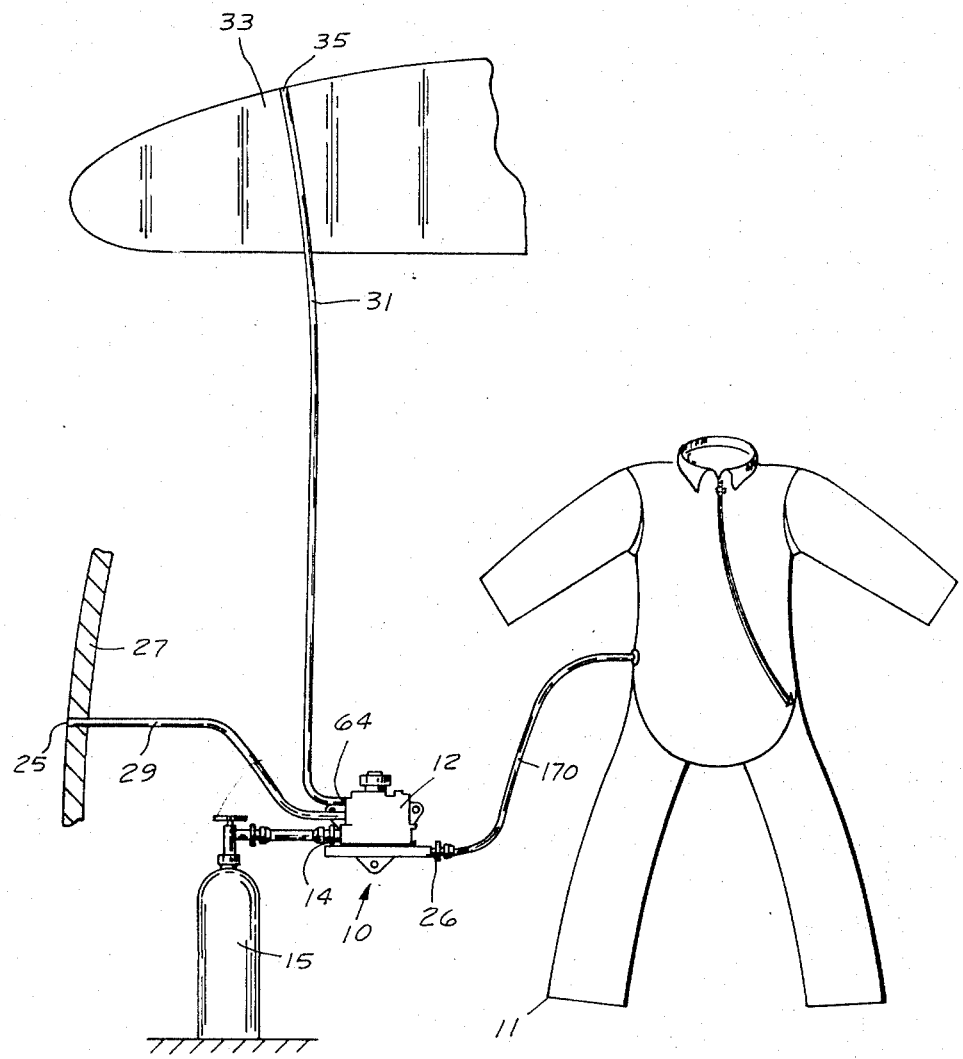
Figure 2:
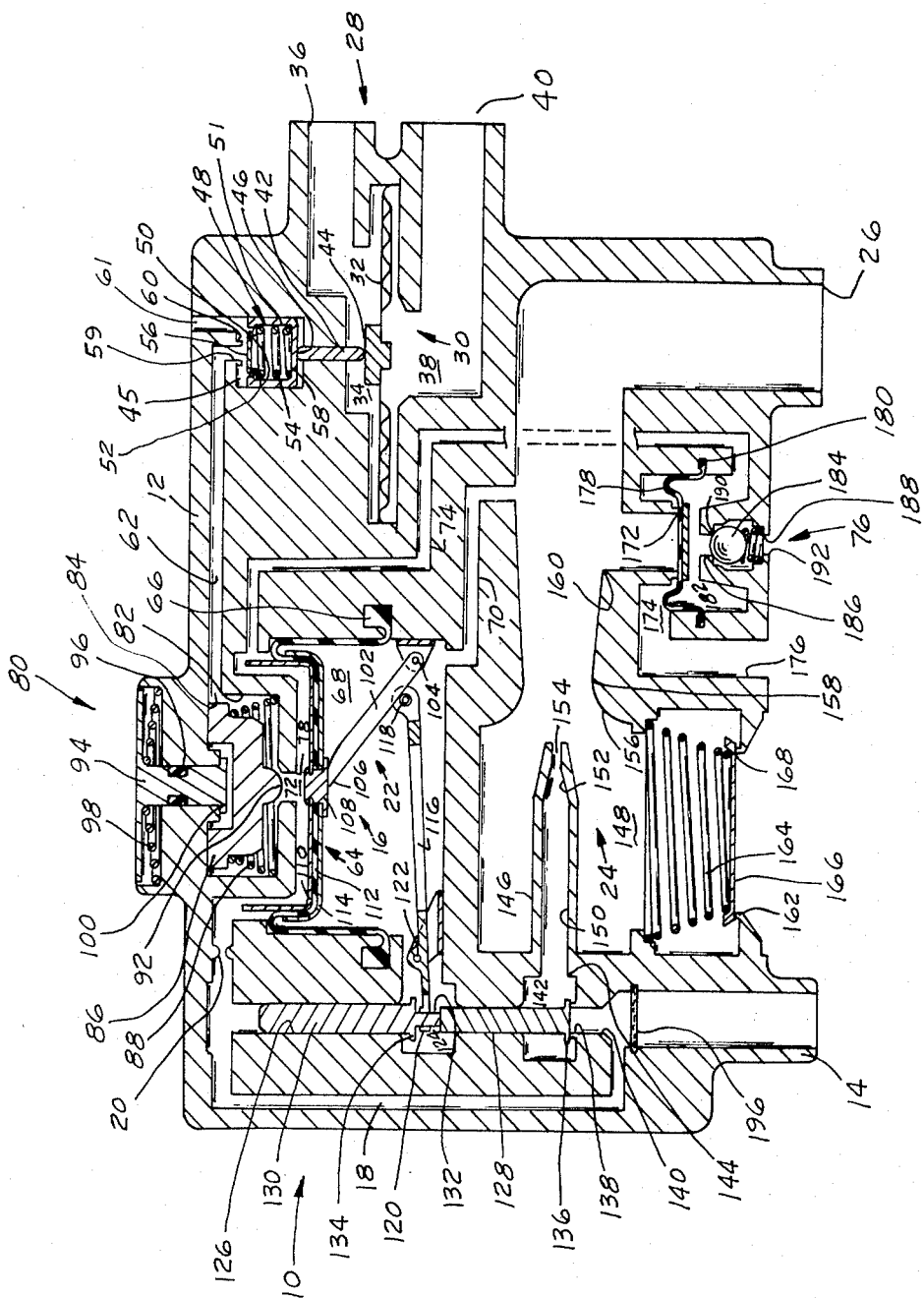

In the drawing in FIG. 1 there is shown schematically an anti-G valve means 10 designed for use with an anti-G garment 11 which is worn by a wearer for protection against any adverse effect created by a rapid increase in acceleration of a vehicle. The anti-G valve 10 has a housing 12 with an inlet port 14 connected to a first source of fluid pressure, usually the oxygen supply 15 in the vehicle. Inlet port 14, as shown in FIG. 2, is directly connected by a passage 18 having a bleed orifice 20 to a first chamber means 16. Located in the first chamber means 16 is valve control means 22 which regulates the flow from the inlet port 14 into a second chamber means 24 in the housing 12. When valve control means 22 permits flow into the second chamber means 24, fluid under pressure is communicated to an anti-G garment 11 through an outlet 26. A third chamber means 28, located in the housing 12 contains sensing means 30 which compares the static pressure adjacent the outside of the vehicle 27, through conduit 29, and the ram pressure along the front face 33 of the vehicle due to velotity,through conduit 31. The sensing means 30 will sense vehicular dynamic conditions which could produce a rapid acceleration and adversely affect the wearer of the anti-G garment 11 and causes the control valve means 22 to be activated prior to any actual force being received by a recipient wearer in the vehicle.

The third chamber means 28, as shown in FIG. 2, in more particular detail includes a sensing means 30 having a metal diaphragm 32 or wall means secured at its periphery to the housing 12 for dividing the interior of the third chamber means 28 into a reference chamber 34, connected by conduit 29 to receive the static pressure 25 from an unpressurized area of the vehicle 27 and a sensing chamber 38 connected by conduit 31 to receive the ram pressure 35 created along the front edge 33 of the vehicle as the vehicle accelerates through a fluid. The metal diaphragm 34 will deflect proportionally to the pressure differential caused by the ram 35 and static pressures 25. A link 42 slidably retained in housing 12 has one end 46 in an outlet chamber 45 connected to a plunger member 48 and the other end 44 connected to the metal diaphragm 34. The plunger member 48 has a blind cavity 50 with a stop 52 concentrically located around the interior edge 54 of the plunger member 48. A concentric face member 56 is located in the interior of the blind cavity 50 and a resilient member 58 located to abut the bottom of the blind cavity 50 urges the face member 56 against the stop 52. A seat 60 is formed around the outlet of a passageway 62 connected to the first chamber means 16. An outlet port 61 connects the outlet chamber 54 with the cabin where any of the first fluid under pressure released from the first chamber 16 can escape to ambient under the control of the position of the plunger member 48 with respect to the seat 60.

In the first chamber means 16 containing valve control means 22, a diaphragm means 64 has its outer periphery 66 secured in the housing 12 to divide the first chamber means 16 into a control chamber 68 connected to the second chamber means 24 by a passage 70, and a flow chamber 72, connected by passageway 74 to a pressure dump valve means 76. The flow chamber 72 has an outlet 78 into a chamber 82 which contains a gravitational positioning means 80. Chamber 82 is connected by outlet 84 to the passageway 62 going to the outlet control chamber 45.

The gravitational positioning means 80 includes a weight member 86 surrounded by a spring member 88 which urges a face 92 away from the outlet 78. A tee-shaped button 94 extends through and is sealed in an opening 96 in the housing 12 adjacent the weight member 86. A resilient member 98 urges a projection 100 against the housing 12 to prevent undesired contact of the button 94 and the weight member 86. The tee-shaped button 94 can be manually activated to test the flow capabilities of the anti-G valve means 10 to assure operational effectiveness prior to installation in the vehicle.

A first lever arm 102 in control chamber 68 has one end 104 pivotally secured to the housing in the control chamber 68 and the other end 106 held against the head of rivet 108 which positions a first backing plate 110 and a second backing plate 114 together for holding the flexible portion 112 of the diaphragm means 64. A second lever arm 116 has a roller member 118 on one end and fork 120 on the other end with a pivot 122 positioned adjacent an opening to a valve positioning chamber 124. The valve positioning chamber 124 has a first bore 126 and a second bore 128 connected to the passage 18 supplying the first source of fluid under pressure to the flow control chamber 72. A valve shaft 130 located in the first bore 126 and the second bore 128 has a small diameter section 132 adjacent an annular shoulder 134 in the valve positioning chamber 124. The small diameter section 132 mates with the prongs of the forked end 120 of the second lever arm 116. A face member 136, on an end of the valve shaft 130 has an annular portion surrounding a projecting seat 138 of opening 140 from inlet 14 to balance the mass in the shaft portion 130 above the connection with the second lever arm 116 to eliminate the first source of fluid from influencing the position of the diaphragm means 64 since both ends of the shaft have the same area exposed to the same pressure.

An expansion chamber 142 adjacent opening 140 connected to inlet 14 by common passage 18 has an outlet 144 connected to a nozzle 146 which extends into a suction chamber 148 of the second chamber means 24. An opening 162 in the housing 12, which communicates with the suction chamber, is closed by a resilient member 164 urging a cap 166 against a projecting rib 168 extending inwardly from the housing 12. The nozzle 146 has a long cylindrical interior surface 150 with a convergent section 152 having a smaller diameter exiting portion 154. The interior of the second chamber means 24 adjacent the suction chamber 148 approximates a venturi meter with a converging section 156, a throat section 158 and a diffuser section 160. Fluid flows through diffuser section 160 past the outlet 26 into conduit 170 in communication with the anti-G suit 11.

The pressure dump valve means 76 has a dump chamber 174 connected to the diffuser section 160 through a passage 172. The dump chamber 174 is connected to ambient through passage 176 in the housing 12. The dump chamber 174 is divided by a diaphragm 178 having its periphery 180 secured to the housing 12. Conduit 74 communicates the pressure in the flow control chamber 72 from the first source of fluid to a relief chamber 182 adjacent one side of the diaphragm 178. The pressure from the first source of fluid holds the diaphragm 178 against the opening from passage 176 into dump chamber 174 to maintain a predetermined pressure in the diffuser section 160 of the second chamber means 24. A ball 184 held by spring member 188 against an opening 186 will limit the intensity of this predetermined holding pressure against the diaphragm 178 by moving away from the seat 190, thereby permitting any excessive pressure to escape through opening 192 into ambient.

MODE OF OPERATION OF THE PREFERRED EMBODIMENT

In normal operation when the vehicle is traveling with a constant velocity below that which is injurious to an occupant in the vehicle wearing an anti-G garment 11 it will be deflated. At this velocity, the first source of fluid, shown as contained in vessel 15, is available at inlet 14 and a certain amount travels through passage 18, past restriction 20, and into the flow control chamber 72. The pressure resulting from the flow of the first fluid is communicated through passage 74 into relief chamber 182 to hold the diaphragm 178 against the passage 172 from the diffuser section 160 to maintain the second chamber means 24 in a sealed condition. With the weight 86 of the gravitational positioning means 80 resiliently held against the housing 12 by spring member 88 the first fluid will flow out of the flow control chamber 72 through opening 78 into chamber 82. The first fluid under pressure will continue to flow out of chamber 82 through outlet 84 into passageway 62 past inlet 59 into the outlet chamber 45 and to ambient through outlet port 64. Since both ends of the valve shaft 130 are subjected to the same fluid pressure in conduit 18, valve face member 136 is retained against seat 138 until the pressure differential across the diaphragm means 64 due to a sufficient pressure difference in flow chamber 72 and control chamber 68 is large enough to activate the levers 102 and 116 to move valve shaft 130. This balanced force on the valve shaft 130 eliminates the effects of a variation in the pressure of the first source of fluid as it passes through the filter 196 into the passage 18.

As the velocity of the vehicle increases, the ram pressure correspondingly increases and this resulting ram pressure is carried through conduit 31 into sensing chamber 38. The ram pressure 35 being transmitted to the sensing chamber 38 can be large enough as compared with the static pressure 25 transmitted through conduit 29 to create a dynamic pressure condition which will cause wall member 32 to move the face 56 of the plunger member 48 against seat 60 of the flow passage 62. If the flow passage 62 is sealed, the pressure in flow control chamber 72 will build up causing a pressure differential to develop across the diaphragm means 64. This pressure differential will develop a force which will be transmitted through rivet 106 to the first lever arm 102. Any movement of the diaphragm means 64 will cause lever arm 102 to pivot on pin 104 and apply a force to roller 118 which can shift on the lever arm. The force applied to roller 118 will pivot the second lever arm 116 around pin 122 moving forked end 120 along the small diameter 132 of the valve shaft 130 into abutment with shoulder 134. With sufficient force created by the pressure differential across lowering valve means 64 the forked end 120 will move the valve shaft 130 to open the expansion chamber 142 to the flow of the first source of fluid initially lowerong the pressure because of the larger area of the expansion chamber 142 for retaining a volume of the fluid. This quantity of fluid Q for a particular condition can be represented and determined by the following equation:

$$Q = V_o A_o = V_x A_x$$

where:
$V_o$ = the velocity of the fluid
$A_o$ = the area of the passage
$V_x$ = velocity at any point in system
$A_x$ = area of passage in system at point x The velocity of the $V_o$ can be calculated from the following equation:

$$V = \sqrt{2(P_x - P_o)}/K$$

where:
$K$ = specific weight of the fluid, gravity and flow coefficients
$P_o$ = initial pressure at the inlet
$P_x$ = pressure at any point in the system As can be seen, the amount of fluid Q which will be carried through the opening 140 is directly dependent upon the initial pressure $P_o$ at the inlet 14. This amount of fluid Q supplied to the expansion chamber will be constant for any given period of time and from this, it will follow that as the first source of fluid passes through the long cylindrical portion 150 of the nozzle 146, the velocity will correspondingly increase. In addition, the pressure of the fluid will decrease in the same manner and reach a minimum as the fluid ejects from the exiting portion 154 as the velocity reaches its maximum. The low pressure which is created as the first source of fluid exits from the nozzle 146 will create a pressure differential across cap 166 compressing resilient member 164. With resilient member 164 compressed, a second source of fluid, usually the ambient air surrounding the anti-G valve means 10, enters the suction chamber 148. The exiting portion 154 of the nozzle 146 is concentrically positioned adjacent the opening to the converging portion 156. Because of the high velocity of the first fluid leaving the exiting portion 154, a large quantity of the second fluid is entrained and carried into the converging portion 156 through the throat 158 and into the diffuser portion 160. Thus, the anti-G suit is initially rapidly inflated with a mixture of the first and second fluids to begin protecting the wearer before any adverse gravitational forces are applied.

When the acceleration forces increase, above 1.75 g, the weight member 86 will overcome the resilient member 88 closing the opening 78 to maintain the pressure in the flow chamber 72. As the pressure in the anti-G suit increases, passage 70 transmits this same pressure force to the control chamber 68 to reduce the pressure differential across the diaphragm means 64. With a reduction in this pressure differential, the force transmitted to the first lever arm 102 is reduced causing the second lever arm 116 to move the valve shaft 130 toward the valve seat 138. Thus, the amount of the first fluid admitted to the expansion chamber is continually reduced in a direct relationship with the differential between the prssure in the flow chamber 72 and the control chamber 68. When the pressure in the flow chamber 72 and the control chamber 68 are equal, the anti-G suit will be completely inflated to the protective pressure. As the flow of the first fluid is reduced, the pressure in the suction chamber 148 will increase and the flow of the second fluid correspondingly reduced and finally stopped before the flow of the first fluid is prohibited bY face 136 closing opening 140.

The anti-G suit will remain pressurized as long as acceleration forces are sensed by the anti-G valve. If at some time, the pressure in the flow control chamber 72 increases above a predetermined value, the passage 74 will permit the fluid to flow to the relief chamber 182 where spring 188 will be collapsed and the pressure will escape harmlessly to ambient by flowing through oepning 192.

When the acceleration forces are reduced or the velocity of the vehicle is reduced, the pressure in the anti-G suit 11 will be greater than ambient pressure. This will permit the resilient member 88 to reposition weight 86 against housing 12 to permit the first fluid to flow through opening 72 into passage 62 and the outlet chamber 45. The pressure differential across wall means 32 will have dissipated and plunger means 48 will have moved face 56 away from seat 60 thereby permitting the first source of fluid to be discharged into ambient through outlet 61. At the same time the pressure in the anti-G suit 11 will be larger than that existing in relief chamber 182 allowing diaphragm member 178 to be moved away from the opening 172 going to the diffuser section 160. With the diaphragm member 178 unseated, the existing high pressure in the anti-G suit will escape through passage 176 into ambient thereby reducing the applied pressure to the body of the wearer of the anti-G suit. The deflation of the anti-G suit will continue until the differential pressure across the diaphragm member is equal to the pressure transmitted to the relief chamber against the diaphragm to seal the opening 172 from the diffuser 160 in the second chamber means 24.

Thus, through this anti-G valve means 10 with sensing means 30, we have provided a wearer of an anti-G suit increased protection by anticipating any adverse accelerational force which may be experienced by the velocity of a vehicle.

We claim:

1. An anti-G valve for use with an anti-G garment comprising:
    a housing having a first chamber connected to an inlet port in communication with a first source of fluid under pressure and a first outlet port in communication with ambient, a second chamber connected to said inlet port and a second outlet port in communication with said anti-G garment, and a third chamber connected to receive a signal representative of the dynamic conditions which could adversely effect a recipient wearer of the anti-G garment;
    a weight located in said first chamber, said weight moving in response to an accelerational force;
    control valve means located in said first chamber responsive to movement of said weight, said control valve opening a supply passage to said second chamber for permitting said first source of fluid to pressurize said anti-G garment, said pressurized anti-G garment protecting the recipient wearer thereof from any adverse effects caused by a rapid increase in the accelerational force; and
    anticipatory means located in said third chamber for comparing the signal received from the dynamic condition with a reference signal to create an operation signal, said created operational signal being transmitted to said control valve means for opening said inlet port into said second chamber to permit said first source of fluid to begin inflating said anti-G garment prior to the operation of said control valve means by movement of said weight.

2. The anti-G valve as recited in claim 1 wherein said anticipatory means includes:
    wall means which divides said third chamber into a reference chamber and a sensing chamber, said reference chamber receiving a reference pressure and said sensing chamber receiving a velocity pressure, said reference pressure and velocity pressure creating a differential pressure across said wall means to provide said operational signal.

3. The anti-G valve as recited in claim 2 wherein said anticipatory means further includes:
    a plunger member connected to said wall means which when receiving said operational signal closes the first outlet port to restrict the flow of said first source of fluid from said first chamber.

4. The anti-G valve as recited in claim 3 wherein said control valve means includes:
    diaphragm means which divides said first chamber into a first control chamber and a flow chamber, said first control chamber being connected to said second chamber to receive the fluid pressure that is transmitted to said anti-G garment.

5. The anti-G valve as recited in claim 4 wherein said control valve means further includes:
    a shaft located in a bore in said housing, said bore being opened on both ends to the supply passage which transmits said first source of fluid to said flow chamber to balance the pressure on both ends of said shaft, said shaft having a face which seats on the housing surrounding a first opening in said supply passage to said second chamber from said inlet port, said shaft being responsive to the movement of said diaphragm means in response to a pressure differential between the flow chamber and the control chamber.

6. The anti-G valve as recited in claim 5 wherein said control valve means further includes:
    a first lever located in said first control chamber having one end thereof pivotally attached to the housing and the other end thereof positioned adjacent said diaphragm means; and
    a second lever having one end thereof connected to said shaft and the other end thereof slidably retained by said first shaft, said second lever being positioned in said first control chamber by a pivotal connection adjacent the bore retaining said shaft.

7. The anti-G valve as recited in claim 6 wherein said control valve means further includes:
    a second opening in the housing located between said flow chamber and a first passage communicating with said first outlet port; and
    resilient means for urging said weight away from said second opening in opposition to the force exerted by said acceleration force to permit said first source of fluid to flow to ambient through said first passage.

8. The anti-G valve as recited in claim 7 wherein said weight moves in response to an accelerational force overcoming said resilient means and closes the first passage from the flow chamber to the first outlet port, said first source of fluid in said flow chamber and the fluid pressure in said control chamber creating a pressure differential across said diaphragm means, said pressure differential causing said diaphragm means to move said first lever arm and transmit movement to said second lever arm, said second lever arm moving said shaft away from said first opening to said second chamber.

9. The anti-G valve as recited in claim 8 wherein said supply passage from said first opening from the inlet port to said second chamber includes:

a nozzle connected to said supply passage which extends into said second chamber, said nozzle having a convergent end section which increases the velocity of said first fluid being communicated from said inlet port, said increase in the velocity of said first fluid lowering the pressure in said second chamber adjacent the outlet of said nozzle, said lowered pressure permitting ambient air pressure to overcome a resilient member and enter said second chamber, said ambient air and said first source of fluid inflating and pressurizing said anti-G garment to protect said recipient wearer.

10. The anti-G valve as recited in claim 9 wherein said second chamber includes:

a diaphragm member dividing a second passage to said second outlet port into an ambient chamber and a second control chamber, said second control chamber being connected to the flow chamber in said first chamber, said pressure differential across the diaphragm member controlling the fluid flow through the second outlet port from said second chamber.

11. The anti-G valve as recited in claim 10 further including:

relief means located in the second passage between the second control chamber of said second chamber and the flow chamber in said first chamber for limiting the fluid pressure acting across said diaphragm member controlling the second outlet port.

12. The anti-G valve as recited in claim 11 further including:

manual means for controlling the movement of said weight to test the operational characteristics of the control valve.

13. An anti-G valve for use with an anti-G garment comprising:

a housing having a first chamber connected to an inlet port in communication with a first source of fluid under pressure and an outlet port in communication with ambient and a second chamber connected to said inlet port and a second outlet port in communication with said anti-G garment, said second chamber having an opening to ambient;

a weight located in a cavity in the housing, said weight moving in response to an accelerational force;

control valve means located in said first chamber responsive to movement of said weight, said control valve opening a supply passage from the inlet port to said second chamber;

closure means resiliently held against the housing surrounding the ambient opening in said second chamber; and nozzle means connected to said supply passage for lowering the pressure in said second chamber upon opening of said supply passage allowing said first fluid to flow, said lowered pressure in said second chamber and ambient creating a pressure differential across said closure means, said pressure differential moving the resiliently held closure means away from said opening and permitting ambient to enter said second chamber, said first source of fluid and ambient being combined to pressurize the anti-G garment with a fluid mixture to conserve the first source of fluid.

14. The anti-G valve as recited in claim 13 wherein said nozzle means includes:

a cylindrical section connected to said supply passage; and a convergent end section connected to said cylindrical section, said convergent end section extending into said second chamber, said convergent end causing the velocity of said first fluid flowing through said passage to increase, said first fluid at the increased velocity exiting from said end section into said second chamber causing the pressure in the second chamber to be lowered and a pressure differential created across said closure means.

15. The anti-G valve as recited in claim 14 further including:

relief means located in the second passage between the second control chamber of said second chamber and the flow chamber in said first chamber for limiting the fluid pressure acting across said diaphragm member controlling the second outlet port.

16. The anti-G valve as recited in claim 15 further including:

manual means for controlling the movement of said weight to test the operational characteristics of the control valve.

17. The anti-G valve as recited in claim 14 further including:

relief means connected to said second chamber for limiting the pressure of the fluid mixture supplied to the anti-G garment.

* * * * *